United States Patent
Hallock et al.

(10) Patent No.: US 9,116,607 B2
(45) Date of Patent: Aug. 25, 2015

(54) INTERFACE INCLUDING SELECTABLE ITEMS CORRESPONDING TO SINGLE OR MULTIPLE DATA ITEMS

(75) Inventors: Joseph Hallock, Renton, WA (US); Dileep Kumar, Redmond, WA (US); Kenneth Patrick Coleman, Bothell, WA (US); Lara Arguelles, Seattle, WA (US); Trinh Vo Yetzer, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 13/104,993

(22) Filed: May 11, 2011

(65) Prior Publication Data

US 2012/0290982 A1   Nov. 15, 2012

(51) Int. Cl.
*G06F 3/048* (2013.01)
*G06F 3/0484* (2013.01)
*G06F 3/0485* (2013.01)
*G06Q 10/10* (2012.01)
*G06F 3/0481* (2013.01)
*G06F 9/44* (2006.01)
*G06F 3/0482* (2013.01)
*G06F 17/24* (2006.01)

(52) U.S. Cl.
CPC .......... *G06F 3/04842* (2013.01); *G06F 3/0485* (2013.01); *G06F 3/0481* (2013.01); *G06F 3/0482* (2013.01); *G06F 9/4443* (2013.01); *G06F 17/24* (2013.01); *G06F 2203/04806* (2013.01); *G06Q 10/10* (2013.01)

(58) Field of Classification Search
CPC . G06F 3/0236; G06F 3/0362; G06F 3/04817; G06F 3/0485; G06F 3/0488; G06F 17/30064; G06F 3/0481; G06F 3/0482; G06F 9/4443; G06F 17/24; H04M 1/233; H04N 21/42204; H04N 5/44543; G06Q 10/10
USPC .......................................... 715/828; 707/203
See application file for complete search history.

(56) References Cited

U.S. PATENT DOCUMENTS 4,437,093 A   3/1984   Bradley
5,487,141 A   1/1996   Cain et al.
(Continued)

FOREIGN PATENT DOCUMENTS

WO   2011026564 A1   3/2011

OTHER PUBLICATIONS

Integrated Genome Browser User's Gude, Oct. 2009, Copyright (c) 2000-2007 Affymetrix, Inc, 108 pages.*

(Continued)

*Primary Examiner* — Tuyetlien Tran
*Assistant Examiner* — Jaime Duckworth
(74) *Attorney, Agent, or Firm* — Henry Gabryjelski; Kate Drakos; Micky Minhas

(57) ABSTRACT

An interface may include a first portion of a linear scale having first upper and lower bounds and a first plurality of indicators identifying first demarcations of the linear scale between the first upper and lower bounds. A first selectable item corresponding to a single data item and a second selectable corresponding to multiple data items may be arranged along the linear scale. When the second selectable item is selected, the interface may be modified to include a second portion of the linear scale having second upper and lower bounds and the multiple data items corresponding to the second selectable item.

20 Claims, 4 Drawing Sheets

(56) References Cited

U.S. PATENT DOCUMENTS

| | | | |
|---|---|---|---|
| 5,805,133 | A | 9/1998 | Priem et al. |
| 5,956,515 | A | 9/1999 | Beals et al. |
| 5,974,428 | A | 10/1999 | Gerard et al. |
| 6,801,229 | B1 | 10/2004 | Tinkler |
| 6,850,944 | B1 | 2/2005 | MacCall et al. |
| 6,950,874 | B2 | 9/2005 | Chang et al. |
| 6,966,002 | B1 | 11/2005 | Torrubia-Saez |
| 7,209,901 | B2 | 4/2007 | Schull |
| 7,313,764 | B1 | 12/2007 | Brunner et al. |
| 7,496,829 | B2 | 2/2009 | Rubin et al. |
| 7,702,639 | B2 | 4/2010 | Stanley et al. |
| 7,721,307 | B2 | 5/2010 | Hendricks et al. |
| 8,103,969 | B2 | 1/2012 | Gupta et al. |
| 8,219,528 | B1 | 7/2012 | Greene et al. |
| 2003/0122874 | A1 | 7/2003 | Dieberger et al. |
| 2004/0268270 | A1 | 12/2004 | Hill et al. |
| 2005/0091596 | A1 | 4/2005 | Anthony et al. |
| 2005/0286428 | A1* | 12/2005 | Oksanen et al. ............ 370/241 |
| 2006/0036960 | A1* | 2/2006 | Loui ............................ 715/764 |
| 2006/0156228 | A1 | 7/2006 | Gallo et al. |
| 2006/0156237 | A1* | 7/2006 | Williams et al. ............ 715/720 |
| 2006/0253795 | A1 | 11/2006 | Titov et al. |
| 2006/0274164 | A1* | 12/2006 | Kimura et al. ............ 348/231.3 |
| 2007/0079251 | A1 | 4/2007 | Peterkofsky et al. |
| 2007/0130232 | A1* | 6/2007 | Therrien et al. ............ 707/204 |
| 2007/0143493 | A1 | 6/2007 | Mullig et al. |
| 2007/0150810 | A1 | 6/2007 | Katz et al. |
| 2007/0229524 | A1 | 10/2007 | Hendrey et al. |
| 2007/0261025 | A1 | 11/2007 | Seto et al. |
| 2008/0034013 | A1* | 2/2008 | Cisler et al. ................ 707/203 |
| 2008/0126989 | A1 | 5/2008 | Flores et al. |
| 2008/0307345 | A1* | 12/2008 | Hart et al. ................... 715/769 |
| 2009/0176509 | A1 | 7/2009 | Davis et al. |
| 2009/0198649 | A1 | 8/2009 | Vaughan et al. |
| 2009/0260021 | A1 | 10/2009 | Haenel et al. |
| 2009/0327952 | A1 | 12/2009 | Karas et al. |
| 2010/0070888 | A1 | 3/2010 | Watabe et al. |
| 2010/0162161 | A1 | 6/2010 | Lin et al. |
| 2010/0231595 | A1 | 9/2010 | Dang et al. |
| 2010/0306171 | A1 | 12/2010 | Antos et al. |
| 2010/0312754 | A1* | 12/2010 | Bear et al. .................... 707/685 |
| 2010/0325574 | A1 | 12/2010 | Olsen |
| 2011/0029907 | A1 | 2/2011 | Bakhash |
| 2011/0066457 | A1 | 3/2011 | Chang et al. |
| 2011/0113365 | A1 | 5/2011 | Kimmerly et al. |
| 2011/0161316 | A1 | 6/2011 | Jeh et al. |
| 2011/0161915 | A1 | 6/2011 | Srinivasamoorthy et al. |
| 2011/0202932 | A1 | 8/2011 | Borghini et al. |
| 2012/0084689 | A1 | 4/2012 | Ledet et al. |
| 2012/0206484 | A1 | 8/2012 | Hauschild et al. |
| 2012/0284662 | A1 | 11/2012 | Kumar et al. |
| 2012/0287114 | A1 | 11/2012 | Hallock et al. |
| 2013/0019251 | A1 | 1/2013 | Kumar et al. |

OTHER PUBLICATIONS

The Integrated Genome Browser: free software for distribution and exploration of genome-scale datasets. Bioinformatics. Oct. 15, 2009;25(20):2730-1.*

Kimmerly, et al., "Scrolling Large Data Sets", U.S. Appl. No. 12/615,235, filed Nov. 9, 2009, pp. 28.

"WinForms Schedule Control Quick Start Guide", Retrieved at <<http://www.devcomponents.com/kb/questions.php?questionid=122>>, Retrieved Date: Feb. 22, 2011, pp. 20.

"HTC Touch Dual Review", Retrieved at <<https://anaqua.partners.extranet.microsoft.com/anaqua/Patent/PatentMainDetails.aspx?RecordId=83807614>>, Posted Date: Feb. 12, 2008, pp. 6.

"ItemContainer Control Pattern", MSDN, Retrieved at <<http://msdn.microsoft.com/en-us/library/ee671280(d=printer,v=VS.85).aspx>>, Feb. 21, 2011, 4 pages.

"Using Aero Flip 3D", Retrieved at <<http://windows.microsoft.com/en-IN/windows7/Using-Aero-Flip-3D>>, Feb. 14, 2011, 1 page.

"Windows Vista FastCARD", Retrieved at <<http://www.axzopress.com/downloads/pdf/1423959094fc.pdf>>, Mar. 2008, Axzo, 6 pages.

Integrated Genome Browser User's Guide, Oct. 2009, Affymetrix, Inc., pp. 1-108.

Lutz, G., "Handling Large Data Sets with C1DataGrid and C1Chart", ComponentOne.com, Retrieved at <<http://our.componentone.com/2010/06/17/handling-large-data-sets-with-c1datagrid-and-c1chart/>>, Jun. 17, 2010, 5 pages.

McElhearn, K., "Six Tips for using the Dock Efficiently", Macworld.com, Retrieved at <<http://www.macworld.com/article/146966/2010/03/dockuse.html>>, Mar. 10, 2010, 5 pages.

Nicol, J. et al., "The Integrated Genome Browser: Free Software for Distribution and Exploration of Genome-scale Datasets", Bioinformatics, 2009, vol. 25, No. 20, Oxford Journals, Oxford University Press, Oxford, UK, pp. 2730-2731.

O'Reilly, D., "Freeware Lets You Scroll Your Desktop Sideways", CNET News, Retrieved at <<http://news.cnet.com/8301-13880_3-20009813-68.html>>, Jul. 8, 2010, 4 pages.

Shannon, R., "Objects and Properties", YourHTMLSource.com, Retrieved at <<http://www.yourhtmlsource.com/javascript/objectsproperties.html>>, Mar. 21, 2011, 3 pages.

Tanenbaum, A., "Modern Operating Systems, 3rd Edition, 2008, Pearson Education, Inc., Upper Saddle River, NJ, pp. 343-347.

Wyland, R., "Making the Switch: PC to MAC", Retrieved at <<http://blog.platinumsolutions.com/node/248>>, Jul. 13, 2009, 12 pages.

* cited by examiner

INTERFACE INCLUDING SELECTABLE ITEMS CORRESPONDING TO SINGLE OR MULTIPLE DATA ITEMS

BACKGROUND

Certain computer systems, such as backup systems or revision control systems (e.g., a source code version control system), may maintain multiple versions of files. For example, a new version of a file may be stored periodically (e.g., nightly) or whenever the contents of the file changes. Such systems may enable a user to revert a file back to any of the previously stored versions of the file. As the number of files maintained in the system increases, it may become difficult to quickly locate a desired version of a file.

SUMMARY

An interface that includes multiple selectable items is disclosed. Each selectable item may correspond to a single data item or multiple data items. In one implementation, each single data item corresponds to a computer file and the multiple data items may correspond to different versions of the same computer file. A user may view a preview of the computer file by selecting an item in the interface that corresponds to the computer file. Alternately, the multiple data items may correspond to different computer files that were created or stored at a particular point in time. The selectable items may be arranged in the interface along a linear scale (e.g., a linear scale corresponding to time). When an item is selected (i.e., one of the selectable items is selected by a user), the interface may be modified so that the selected item (or contents thereof when the selected item corresponds to multiple data items) is centered on the linear scale. In a particular illustrative example, the interface is modified by redrawing the linear scale with different upper and lower bounds.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
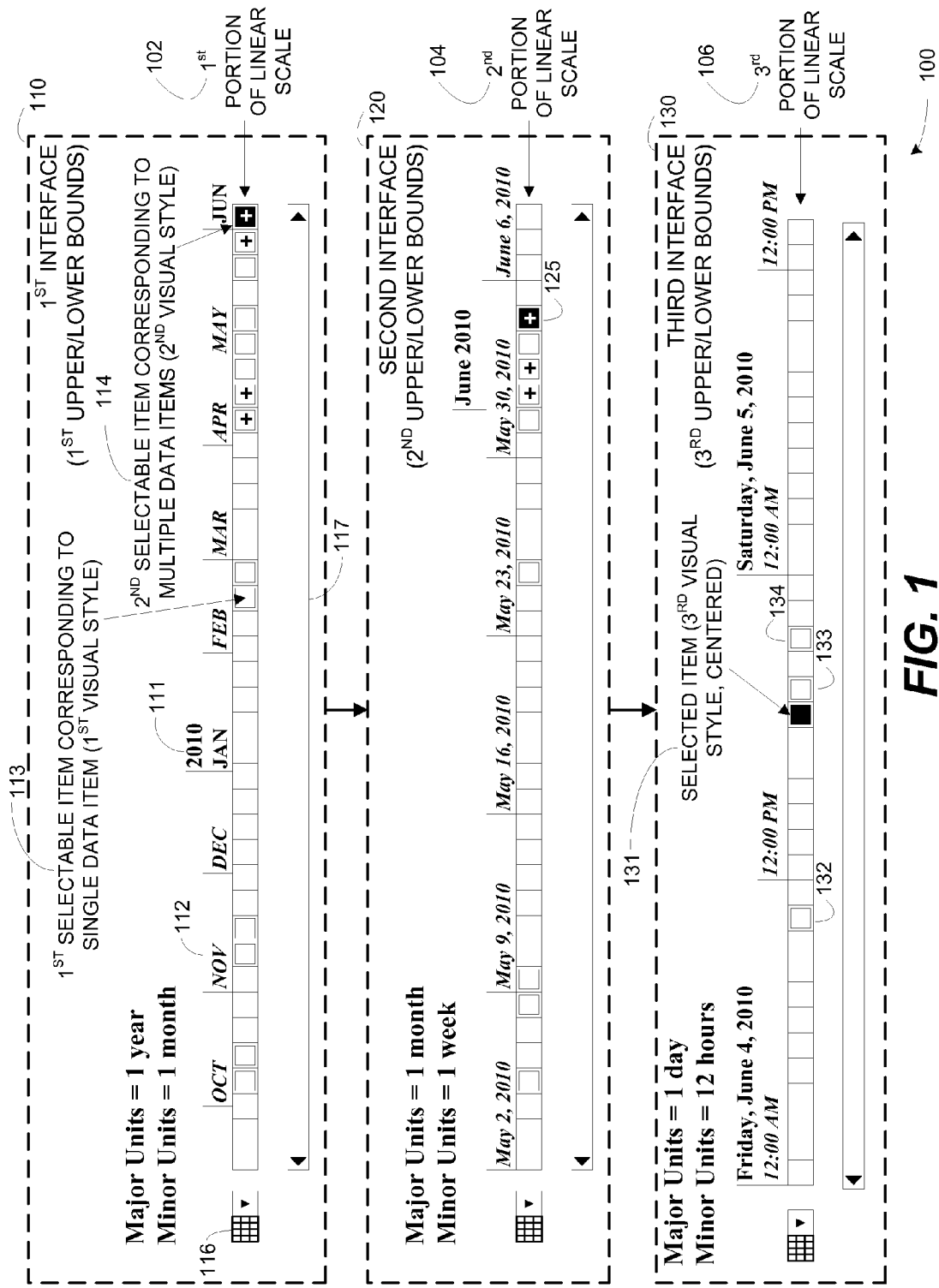
FIG. 1 is a diagram to illustrate a particular embodiment of a method of modifying an interface in response to selections of items displayed in the interface.

An interface may include multiple selectable items, where each selectable item corresponds to a single data item or to multiple data items. In one example, the data items may be versions of computer files. For example, various versions of computer files may be backed up by an application and the interface may enable a user to navigate, preview, select, and restore specific versions of the computer files. The selectable items may be arranged in the interface along a linear scale that has particular upper and lower bounds, and user interaction with the interface may result in redrawing the interface with different upper and lower bounds.

In a particular embodiment, a computer-implemented method includes generating an interface including a first portion of a linear scale having first upper and lower bounds and a first plurality of indicators identifying first demarcations of the linear scale between the first upper and lower bounds. The interface also includes a first selectable item arranged along the linear scale and corresponding to a single data item, and a second selectable item arranged along the linear scale and corresponding to multiple data items. The method also includes transmitting the interface to a display device and receiving a selection of the second selectable item. The method further includes modifying the interface to include a second portion of the linear scale having second upper and lower bounds and the multiple data items corresponding to the second selectable item. The method includes transmitting the modified interface to the display device.

In another particular embodiment, a computer system includes an output interface, an input interface, a processor, and a memory storing instructions executable by the processor to generate an interface including a first portion of a linear scale having first upper and lower bounds and a first plurality of indicators identifying first demarcations of the linear scale between the first upper and lower bounds. The interface also includes a first selectable item arranged along the linear scale and corresponding to a single data item and a second selectable item arranged along the linear scale and corresponding to multiple data items. The instructions are also executable by the processor to transmit the interface for display via the output interface, receive a selection of the second selectable item via the input interface, and determine second upper and lower bounds of the linear scale based on the second selectable item. The instructions are further executable by the processor to modify the interface to include a second portion of the linear scale having the second upper and lower bounds, a second plurality of indicators identifying second demarcations of the linear scale between the second upper and lower bounds, and the multiple data items corresponding to the second selectable item arranged along the linear scale. The instructions are executable by the processor to transmit the modified interface for display via the output interface.

In another particular embodiment, a computer-readable storage medium includes instructions that, when executed by a computer cause the computer to generate an interface including a first portion of a linear scale having first upper and lower bounds and a first plurality of indicators identifying first demarcations of the linear scale between the first upper and lower bounds. The interface also includes a first selectable item arranged along the linear scale and corresponding to a single data item, and a second selectable item arranged along the linear scale and corresponding to multiple data item. The instructions also cause the computer to transmit the interface to a display device, receive a selection of the second selectable item, and determine second upper and lower bounds of the linear scale based on the second selectable item. The instructions further cause the computer to modify the interface to include a second portion of the linear scale having the second upper and lower bounds, a second plurality of indicators identifying second demarcations of the linear scale between the second upper and lower bounds, and the multiple data items corresponding to the second selectable item arranged along the linear scale. The instructions cause the computer to transmit the modified interface to the display device.

By way of example, and not limitation, the linear scale may represent a segment of time and each particular selectable item arranged along the linear scale may be associated with a particular point in time. Each particular selectable item may also represent at least one version of at least one file that was backed up at the particular point in time.

Referring to FIG. 1, a particular embodiment of a method of modifying an interface in response to selections of items displayed in the interface is shown. The interface is displayable as a first interface 110, a second interface 120, or a third interface 130. For example, the interfaces 110, 120, and 130 may be generated by a computing device and displayed by an output device (e.g., a monitor or display device) coupled to the computing device.

The first interface 110 includes a first portion of a linear scale 102 having first upper and lower bounds. In the embodiment illustrated, the linear scale 102 represents a segment of time and the upper and lower bounds are mid-September 2009 and early June 2010, respectively. The first portion of the linear scale 102 thus represents a linear continuum of selectable items that are associated with a date and time (i.e., points in time) between September 2009 and June 2010. The first interface 110 may also include a first plurality of indicators identifying first demarcations of the linear scale corresponding to points in time between the first upper and lower bounds (e.g., a major unit indicator 111 for years and a minor unit indicator 112 for months). The first interface 110 may also include a first selectable item 113 and a second selectable item 114 arranged along the linear scale 102. The first selectable item 113 may correspond to a single data item and the second selectable item 114 may correspond to multiple data items. The first interface 110 also includes a scroll bar 117 operable to display selectable items from earlier or later points in time. For example, scrolling left via the scroll bar 117 may display selectable items corresponding to points in time earlier than September 2009 and scrolling right via the scroll bar 117 may display selectable items corresponding to points in time later than June 2010. The first interface 110 further includes a calendar control 116 operable to navigate to a specific point in time. It should be appreciated that although the examples herein refer primarily to time scales, the interfaces and techniques disclosed herein may be used with data sets organized according to a different property (e.g., population data organized by distance from a specific geographic location, physics data organized by mass, etc.) In a particular embodiment, the described techniques may be used in conjunction with a calendar application. For example, an interface of a calendar application may display a time scale with highlighted time slots or items corresponding to meetings or other events.

In a particular embodiment, interfaces may utilize different visual styles to denote different types of selectable items. For example, selectable items such as the first selectable item 113, which corresponds to a single data item, may be displayed in a first visual style (e.g., as an empty square in FIG. 1). Selectable items such as the second selectable item 114, which corresponds to multiple data items, may be displayed in a second visual style (e.g., as a square having a '+' symbol in FIG. 1). When a selectable item is selected, the selected item may be displayed in a third visual style (e.g., as illustrated in FIG. 1 by the second selectable item 114 also being colored black).

In response to a selection of the selectable item 114, the first interface 110 may be modified to become the second interface 120. The second interface 120 may have upper and lower bounds that are different than the upper and lower bounds of the first interface 110. In FIG. 1, the second portion of the linear scale 104 has a lower bound of May 2, 2010 and an upper bound of Jun. 8, 2010. The major units for the second interface 120 may be a period of one month and the minor units may be a period of one week. The second interface 120 may thus show a second portion of the linear scale 104, providing a "zoomed-in" view based on the selection of the selectable item 114 at the first interface 110. The "zoomed in" view may include one or more items corresponding to the selected item 114 from the first interface 110. For example, an item 125 is included in the second interface 120 and corresponds to the selectable item 114 from the first interface.

In response to a selection of the item 125, the second interface 120 may be modified to become the third interface 130. The third interface 130 may have third upper and lower bounds. In FIG. 1, the third interface 130 has a major unit of a day and a minor unit of 12 hours. The lower bound of the third interface 130 may be Friday, Jun. 4, 2010 at 12 a.m. and the upper bound of the third interface 130 may be 1 p.m. on Saturday Jun. 5, 2010, as shown. The third interface 130 includes a third portion of the linear scale 106. It should be noted that the third portion of the linear scale 106 is a subset of the second portion of the linear scale 104, which in turns is a subset of the first portion of the linear scale 102. Thus, a degree of resolution increases as a user traverses from the first interface 110 to the second interface 120 to the third interface 130. For example, the degree of granularity of the third interface 130 is measured in units of 12 hours while the units of the second interface 120 are measured in weeks, and the units of the first interface 110 are measured in months.

In a particular embodiment, selection of an item at an interface may result in the item becoming centered within the interface or a subsequent interface. For example, as depicted in FIG. 1, the selected item 125 may become centered in the third interface 130 as the selected item 131. Although not shown, the selected item 125 may be similarly centered in the second interface 120 in response to the selection of the selectable item 114 in the first interface 110. Further, a selected item that corresponds to multiple data items may be replaced with the multiple data items. For example, the selected item 125 in the second interface 120 may represent all data items having a date of Jun. 4, 2010. In the third interface 130, those data items may be represented individually, as indicated at 131, 132, 133, and 134.

During operation, the first interface 110 may be navigable and a user may interact with the first interface 110. For example, a computer that displays the first interface 110 may receive a selection of the selectable item 114. The user may select the selectable item 114 by using an input device, such as a computer mouse, a keyboard, or a touchscreen. Upon selection of the selectable item 114, the first interface 110 may be replaced by the second interface 120. The upper and lower bounds of the second interface may be determined based on the selected item 114. For example, the upper and lower bounds of the second interface 120 may be chosen such that the second interface 120 results in a "zoomed-in" view that includes that selected item 114 (e.g., as the item 125). In response to user selection of the item 125, the second interface 120 may be replaced with the third interface 130.

In a particular embodiment, each selectable item may represent one or more versions of one or more computer files that were backed up at a particular point in time. For example, referring to the third interface 130, the selected item 131 may represent a version of a computer file that was backed up between 6 p.m. and 7 p.m. Jun. 4, 2010. It will be appreciated that if multiple files were backed up between 6 p.m. and 7 p.m. Jun. 4, 2010, the selected item 131 may have included a '+' symbol.

In a particular embodiment, a user may use a mouse or other input device to select the selected item 131. In response, the user may be presented with a preview of the version of the computer file corresponding to the selected item 131, as further described with reference to FIG. 2. In addition, a user may select the selected item 131 to optionally restore the version of the computer file.

The first, second, and third interfaces 110, 120, 130 may thus be displayed and used by a computer user to quickly navigate and locate desired versions of computer files. It should be noted that although FIG. 1 depicts three interfaces, any number of interfaces may be generated and displayed to a user while the user navigates the stored versions of the computer files. In a particular embodiment, different versions of a particular computer file are each represented by a particular selectable block. In addition, when more than one version of a computer file has a date within a time range designated by a selectable block, a multiple block indicator (e.g., including the '+' symbol) may be displayed. It should be noted that the use of the '+' symbol is for example only. Other symbols or visual indicators may also be used. The user may select the multiple block indicator to traverse from the first display interface 110 to the second interface 120 and to the third interface 130 to navigate and identify a particular version of a computer file of interest. In addition, the user may restore the particular version of the computer file upon navigation and selection. For example, restoring the particular version of the computer files may include copying the particular version of the computer file from a backup system to an active or primary system. Thus, an improved user interface to navigate and view a plurality of versions of different files has been shown.

Figure 2:
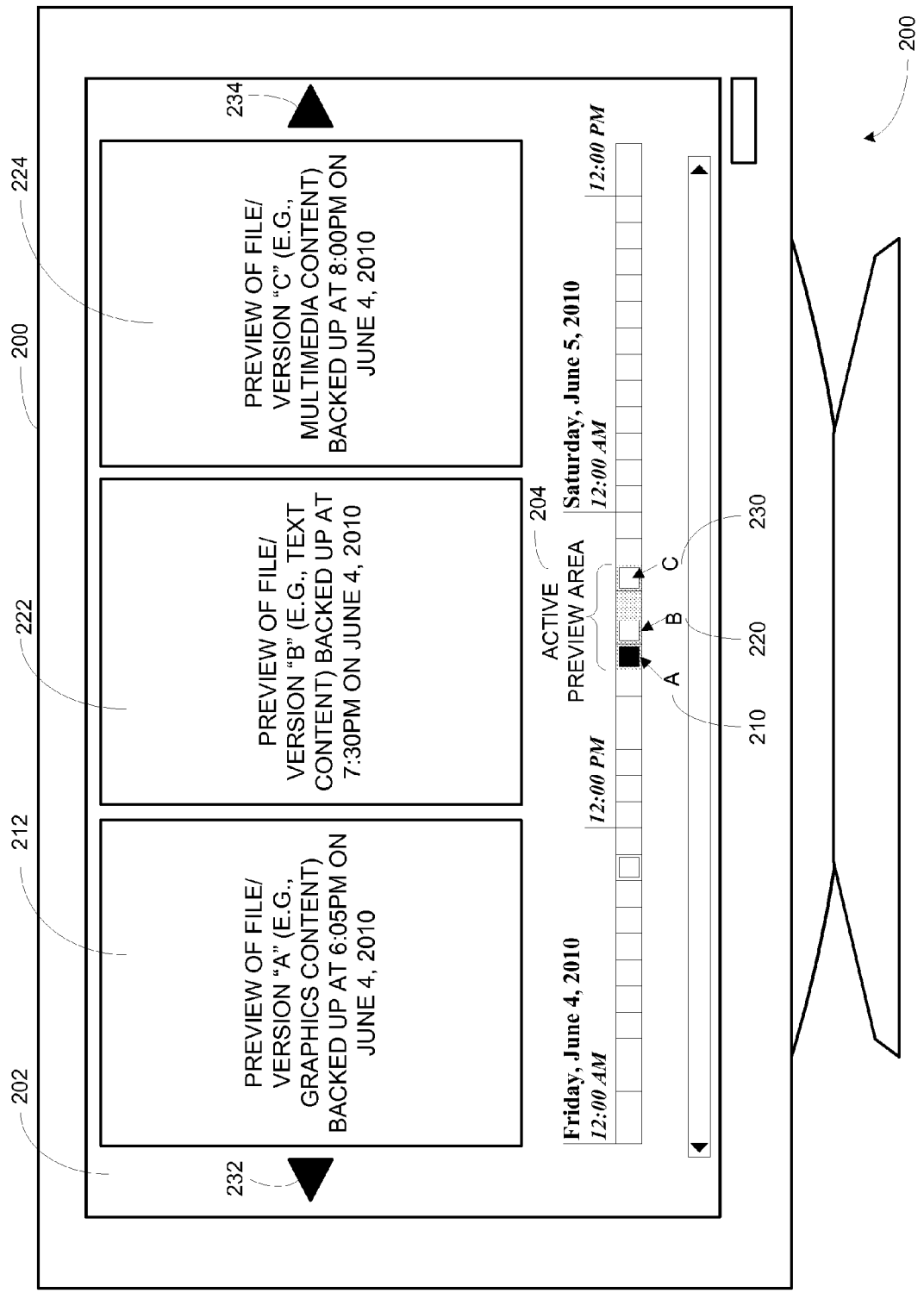
FIG. 2 is a diagram to illustrate a particular embodiment of a method of displaying previews of computer files.

Referring to FIG. 2, a display device 200 and a preview interface 202 is shown. The preview interface 202 includes multiple previews of different versions of computer files. For example, the preview interface 202 includes a version A preview 212, a version B preview 222, and a version C preview 224. The preview interface 202 also includes a left arrow icon 232 and a right arrow icon 234 operable to display additional versions of the files. At the bottom, the preview interface 202 includes a portion of a linear scale, as described with reference to FIG. 1.

A segment of the linear scale corresponding to the previews 212, 222, and 224 may be designated as an active preview area 204 (e.g., shaded gray in FIG. 2). The linear scale includes a first selectable item 210, a second selectable item 220, and a third selectable 230. The first selectable item 210 corresponds to the version A 212, the selectable item 220 corresponds to the version B 222, and the third selectable item 230 corresponds to the version C 224. The preview interface 202 includes multiple regions such that multiple computer files or versions of the same computer file may be shown concurrently.

In the embodiment illustrated in FIG. 2, the version A was backed up at 6:05 p.m. on Jun. 4, 2010. Version B was backed up at 7:30 p.m. on Jun. 4, 2010. Version C was backed up at 8:00 p.m. on Jun. 4, 2010. Each computer file or version thereof may include different types of content. For example, files may include graphics content, text content, or multimedia content, as illustrated in FIG. 2. The linear interface shown in FIG. 2 may be implemented as any of the first, second, and third interface 110, 120, 130 of FIG. 1. In addition, the user may navigate and change the lower and upper bounds of the linear interface as described with respect to FIG. 1.

The linear and scrollable control interface depicted in FIG. 2 may be used to navigate and preview multiple versions of files and may be represented along a linear continuum. Thus, an improved user interface to navigate, preview, and optionally select files for particular actions has been shown.

Figure 3:
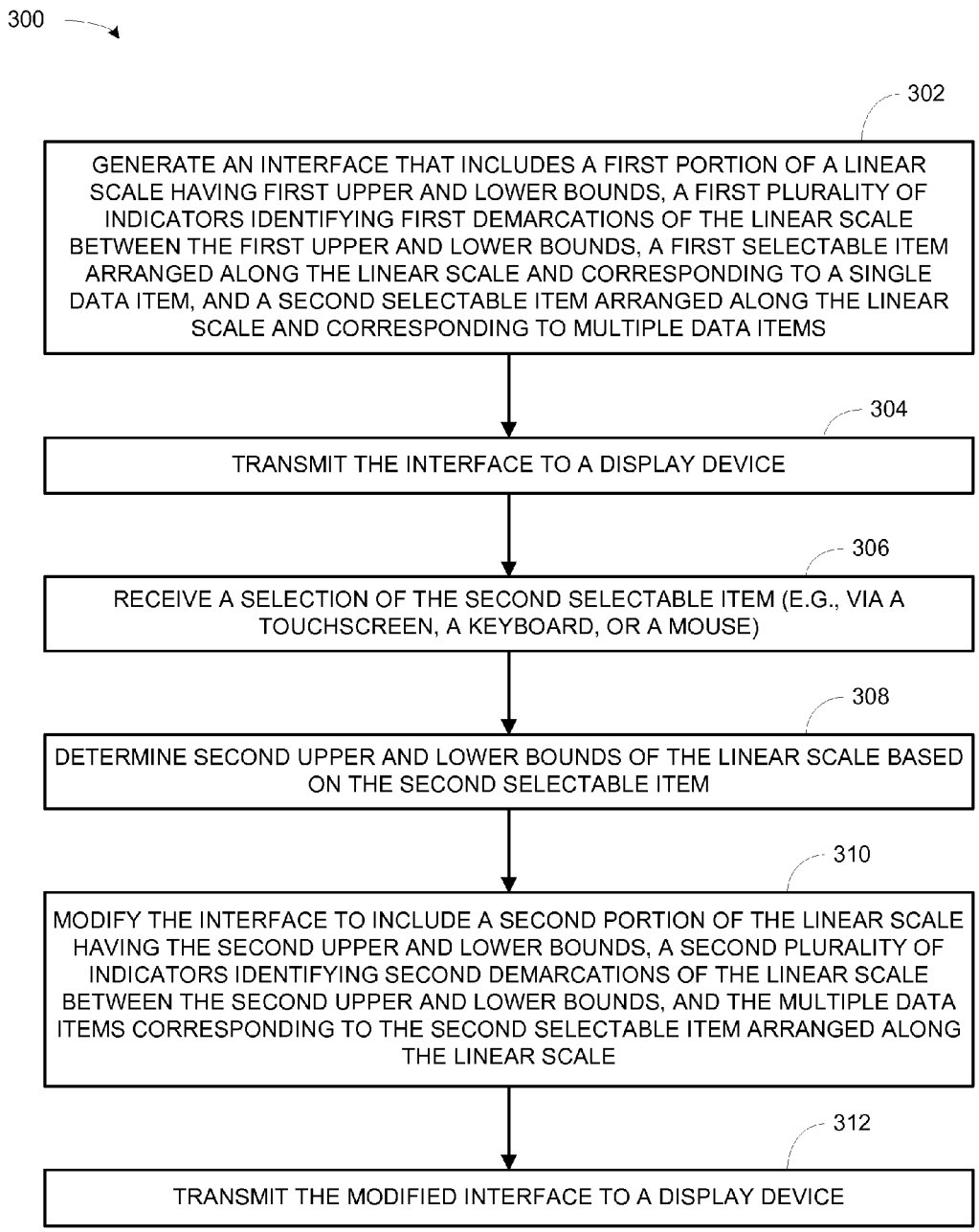
FIG. 3 is a diagram to illustrate a particular embodiment of a method of generating and modifying an interface that includes selectable items corresponding to a single data item or to multiple data items.

Referring to FIG. 3, a particular illustrative embodiment of a computer implemented method is shown. In an illustrative embodiment, the method 300 may be performed by a backup and restore application of a computing device, as further described with reference to FIG. 4, and may be illustrated with reference to FIGS. 1-2.

The method 300 includes generating an interface that includes a first portion of a linear scale having first upper and lower bounds, a first plurality of indicators identifying first demarcations of the linear scale between the first upper and lower bounds, a first selectable item arranged along the linear scale and corresponding to a single data item, and a second selectable item arranged along the linear scale and corresponding to multiple data items, as shown at 302. For example, the first selectable item may be the first selectable item 113 of FIG. 1, and the second selectable item may be the second selectable item 114 of FIG. 1.

The method 300 further includes transmitting the interface to a display device, at 304. For example, the first interface 110 may be transmitted to a display device, such as the display device 200 shown in FIG. 2.

The method includes receiving a selection of the second selectable item, at 306. The selection may be received via a touch screen, a keyboard, or a mouse input device. For example, in FIG. 1, the second selectable item 114 may be selected. The method 300 also includes determining second upper and lower bounds of the linear scale based on the second selectable item, at 308. For example, the lower and upper bounds of the second interface 120 may be determined based on the selected item 114. To illustrate, the lower and upper bounds of the second interface 120 may be selected so as to include, and optionally center, the selected item 114.

The method 300 may further include modifying the interface to include a second portion of the linear scale having the second upper and lower bounds, a second plurality of indicators identifying second demarcations of the linear scale between the second upper and lower bounds, and multiple data items corresponding to the second selectable item arranged along the linear scale, at 310. For example, multiple data items corresponding to the second selectable item 114 may be displayed within the second interface 120. It should be noted that a computer system may alternately modify the first interface 110 to directly show the third interface 130, including the individually selectable items 131, 132, 133, and 134 corresponding to the selectable item 114 in the first interface 110 and the item 125 in the second interface. The items 131-134 may thus represent sub-items of the items 114 and 125.

The method 300 further includes transmitting the modified interface to a display device, at 312. For example, the second interface 120 (or the third interface 130) may be transmitted to the display device 200 shown in FIG. 2. In addition, a user may navigate to select between interfaces depending on the selectable item or the user selected (e.g., via the calendar control 116 of FIG. 1) upper and lower bounds of the linear continuum. The method 300 of FIG. 3 may thus enable the user to navigate and view a plurality of versions of different files.

Figure 4:
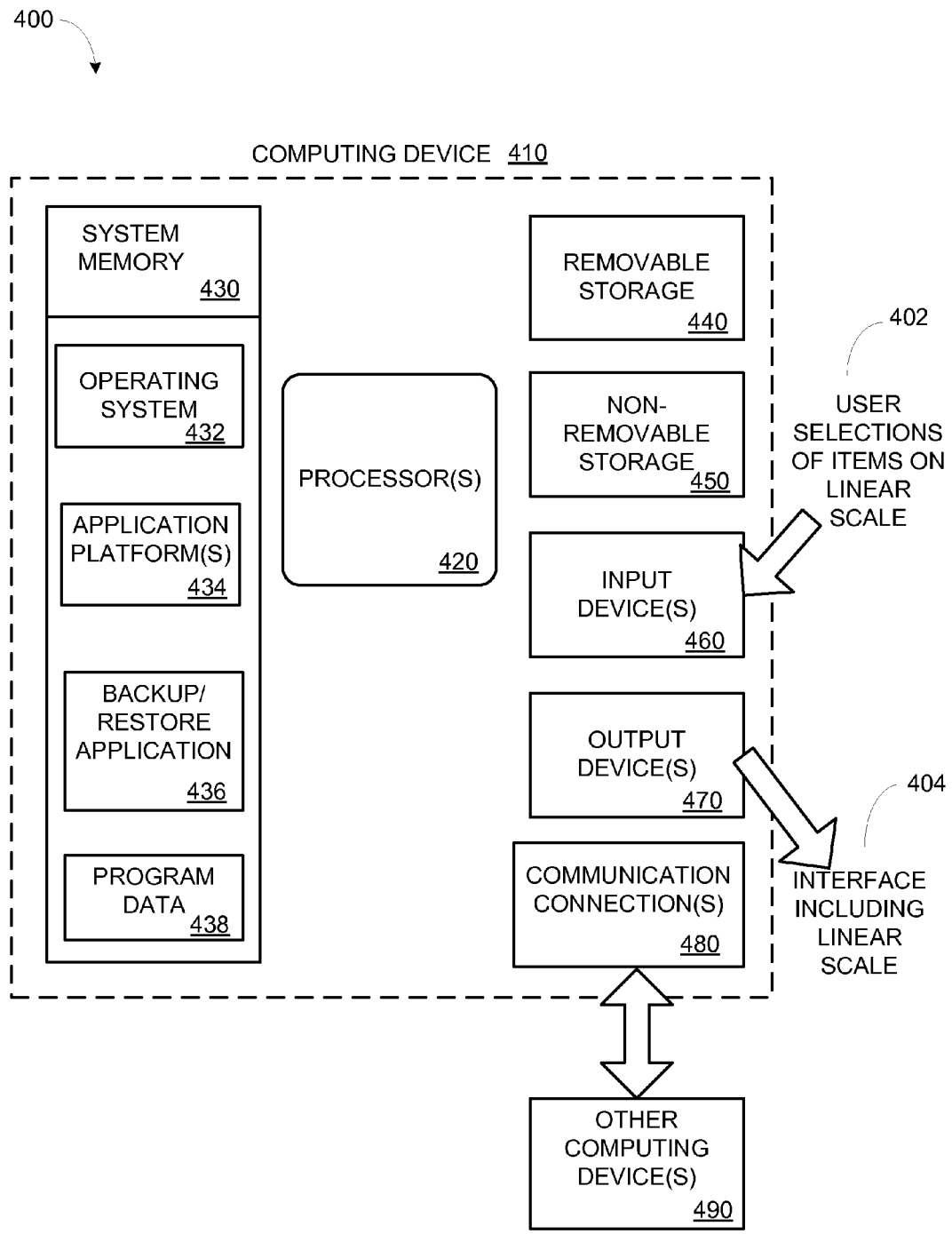
FIG. 4 is a diagram to illustrate a particular embodiment of a computing environment including a computing device to support systems, methods, and computer program products described in FIGS. 1-3.

FIG. 4 depicts a block diagram of a computing environment 400 including a computing device 410 operable to support embodiments of systems, methods, and computer program products according to the present disclosure.

The computing device 410 includes at least one processor 420 and a system memory 430. Depending on the configuration and type of computing device, the system memory 430 may be volatile (such as random access memory or "RAM"), non-volatile (such as read-only memory or "ROM," flash memory, and similar memory devices that maintain stored data even when power is not provided), or some combination of the two. The system memory 430 typically includes an operating system 432, one or more application platforms 434, one or more applications, and program data 438. For example, the one or more applications may include a backup and restore application 436 operable to generate and modify interfaces as described herein. In an illustrative embodiment, the backup and restore application 436 may be represented by instructions that are executable by the processor(s) 420 to perform the functions and methods disclosed herein. For example, the backup and restore application 436 may generate and modify the interfaces 110, 120, and 130 of FIG. 1 and the interface 202 of FIG. 2 based on user input. Alternately, functionality for generating and modifying the interfaces 110, 120, and 130 of FIG. 1 may be performed by one or more other applications or by the operating system 432.

The computing device 410 may also have additional features or functionality. For example, the computing device 410 may include removable and/or non-removable additional data storage devices, such as magnetic disks, optical disks, tape devices, and standard-sized or flash memory cards. Such additional storage is illustrated in FIG. 4 by removable storage 440 and non-removable storage 450. Computer storage media may include volatile and/or non-volatile storage and removable and/or non-removable media implemented in any technology for storage of information such as computer-readable instructions, data structures, program components or other data. The system memory 430, the removable storage 440 and the non-removable storage 450 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 410. Any such computer storage media may be part of the computing device 410.

The computing device 410 may also have input device(s) 460, such as a keyboard, mouse, pen, voice input device, touch input device, motion or gesture input device, etc, connected via one or more wired or wireless input interfaces. In an illustrative embodiment, the input device(s) 460 may receive user selections 402 of items on a linear scale (e.g., a linear scale generated by the backup and restore application 436). Output device(s) 470, such as a display, speakers, printer, etc. may also be connected via one or more wired or wireless output interfaces. In an illustrative embodiment, the output device(s) may output an interface 404 including a linear scale (e.g., an interface generated by the backup and restore application 436, or by another application, such as the illustrated interfaces 110, 120, 130 of FIG. 1 and the interface 202 of FIG. 2).

The computing device 410 also contains one or more communication connections that allow the computing device 410 to communicate with other computing devices 490 over a wired or a wireless network. It will be appreciated that not all of the components or devices illustrated in FIG. 4 or otherwise described in the previous paragraphs are necessary to support embodiments as herein described. For example, the removable storage 440 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. For example, a calendar application may display a time scale including highlighted time slots or items corresponding to meetings or other events.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method, comprising:
displaying at a display device an interface including a first portion of a linear scale having first upper and lower bounds, a first plurality of indicators identifying first demarcations of the linear scale between the first upper and lower bounds, a first selectable item arranged along the linear scale and corresponding to a single data item, and a second selectable item arranged along the linear scale and corresponding to multiple data items;
receiving a selection of the second selectable item;
modifying the interface to include a second portion of the linear scale having second upper and lower bounds and the multiple data items corresponding to the second selectable item;
modifying the interface to include a preview interface, the preview interface including a preview of at least one data item corresponding to the second selectable item;
wherein the preview interface includes at least one of:
a right arrow icon at a right side of the preview interface that is selectable to display a first additional preview associated with a first particular selectable item by adding the first additional preview to the right side of the preview interface while concurrently displaying on the linear scale an indication of the first particular selectable item; and
a left arrow icon at a left side of the preview interface that is selectable to display a second additional preview associated with a second particular selectable item by adding the second additional preview to the left side of the preview interface while concurrently displaying on the linear scale an indication of the second particular selectable item; and
wherein the linear scale represents a segment of time, wherein each selectable item arranged along the linear scale is associated with a particular point in time and represents at least one version of one or more computer files that was backed up at the particular point in time, and wherein the preview interface includes at least one preview of at least one of the one or more computer files corresponding to each selectable item on the linear scale, the preview interface displayed concurrently with a visually designated sub-portion of the second portion of the linear scale and the visually designated sub-portion indicating one or more back-up times associated with the one or more computer files.

2. The computer-implemented method of claim 1, wherein the multiple data items corresponding to the second selectable item are centered along the linear scale in the modified interface, wherein the second upper bound and the second lower bound correspond to a portion of the linear scale that is larger than a second portion of the linear scale, and wherein the second portion of the linear scale corresponds to a third upper bound and a third lower bound.

3. The computer-implemented method of claim 1, wherein the preview interface includes both the right arrow icon and the left arrow icon.

4. The computer-implemented method of claim 1, wherein the linear scale is integrated into a backup and restore application.

5. The computer-implemented method of claim 1, wherein each of the multiple data items corresponds to a particular version of a computer file.

6. The computer-implemented method of claim 1, wherein a plurality of the multiple data items corresponds to a plurality of individually selectable sub-items.

7. The computer-implemented method of claim 1, wherein a visually designated segment comprises a gray band on the linear scale between a third upper bound and a third lower bound.

8. The computer-implemented method of claim 1, wherein the first demarcations correspond to months.

9. The computer-implemented method of claim 8, wherein each particular selectable item arranged along the first portion of the linear scale is associated with a particular day of a particular month associated with the first demarcations.

10. The computer-implemented method of claim 9, wherein for each particular selectable item corresponding to the second selectable item, upon selection of one particular selectable item displaying a backup time.

11. The computer-implemented method of claim 10, wherein the particular selectable item is selectable via the interface to view multiple versions of the one or more computer files.

12. The computer-implemented method of claim 1, wherein each selectable item is selectable via the interface to restore the at least one version of the one or more computer files.

13. The computer-implemented method of claim 1, wherein the selection of the second selectable item is received via a user input device.

14. The computer-implemented method of claim 1, wherein the first selectable item is displayed using a first visual style to indicate a selectable item that is associated with a single data item.

15. The computer-implemented method of claim 14, wherein the second selectable item is displayed using a second visual style to indicate a selectable item that is associated with multiple data items.

16. The computer-implemented method of claim 15, wherein after receiving the selection of the second selectable item, the second selectable item is further displayed using a third visual style to indicate a selectable item that has been selected.

17. A computer system, comprising:
a display device;
an input interface;
a processor; and
a memory storing instructions executable by the processor to:
display at the display device an interface including a first portion of a linear scale having first upper and lower bounds, a first plurality of indicators identifying first demarcations of the linear scale between the first upper and lower bounds, a first selectable item arranged along the linear scale and corresponding to a single data item, and a second selectable item arranged along the linear scale and corresponding to multiple data items;
receive a selection of the second selectable item via the input interface;
determine second upper and lower bounds of the linear scale based on the second selectable item;
modify the interface to include a second portion of the linear scale having the second upper and lower bounds, a second plurality of indicators identifying second demarcations of the linear scale between the second upper and lower bounds, and the multiple data items corresponding to the second selectable item arranged along the linear scale;

modify the interface to include a preview interface, the preview interface including a preview of at least one data item corresponding to the second selectable item; wherein the preview interface includes at least one of:

a right arrow icon at a right side of the preview interface that is selectable to display a first additional preview associated with a first particular selectable item by adding the first additional preview to the right side of the preview interface while concurrently displaying on the linear scale an indication of the first particular selectable item; and a left arrow icon at a left side of the preview interface that is selectable to display a second additional preview associated with a second particular selectable item by adding the second additional preview to the left side of the preview interface while concurrently displaying on the linear scale an indication of the second particular selectable item; and wherein the linear scale represents a segment of time, wherein each selectable item arranged along the linear scale is associated with a particular point in time and represents at least one version of one or more computer files that was backed up at the particular point in time, and wherein the preview interface includes at least one preview of at least one of the one or more computer files corresponding to each selectable item on the linear scale, the preview interface displayed concurrently with a visually designated sub-portion of the second portion of the linear scale and the visually designated sub-portion indicating one or more back-up times associated with the one or more computer files.

18. The computer system of claim 17, wherein the instructions are integrated into a backup and restore application.

19. A computer-readable hardware storage device comprising instructions that, when executed by a computer, cause the computer to:

display an interface including a first portion of a linear scale having first upper and lower bounds, a first plurality of indicators identifying first demarcations of the linear scale between the first upper and lower bounds, a first selectable item arranged along the linear scale and corresponding to a single data item, and a second selectable item arranged along the linear scale and corresponding to multiple data items;

receive a selection of the second selectable item;

determine second upper and lower bounds of the linear scale based on the second selectable item;

modify the interface to include a second portion of the linear scale having the second upper and lower bounds, a second plurality of indicators identifying second demarcations of the linear scale between the second upper and lower bounds, and wherein the modified interface includes a preview interface, the preview interface including at least one preview associated with at least one of the multiple data items corresponding to the second selectable item; wherein the linear scale represents a segment of time, wherein each selectable item arranged along the linear scale is associated with a particular point in time and represents at least one version of one or more computer files that was backed up at the particular point in time, and wherein the preview interface includes at least one preview of at least one of the one or more computer files corresponding to each selectable item on the linear scale that is displayed concurrently with a visually designated sub-portion of the second portion of the linear scale, the visually designated sub-portion indicating one or more back-up times associated with the one or more computer files; and wherein the preview interface includes at least one of:

a right arrow icon located at a right side of the at least one preview of the at least one of the one or more computer files that is selectable to display a first additional computer file at the preview interface while concurrently displaying on the linear scale an indication of the first additional computer file; and a left arrow icon located at a left side of the at least one preview of the at least one of the one or more computer files that is selectable to display a second additional computer file at the preview interface while concurrently displaying on the linear scale an indication of the second additional computer file.

20. The computer-readable hardware storage device of claim 19, wherein one of the selectable items is selectable via the interface to view and restore the at least one version of the one or more computer files.

* * * * *